United States Patent
Shen et al.

(10) Patent No.: US 11,533,154 B2
(45) Date of Patent: Dec. 20, 2022

(54) METHOD FOR CONFIGURING RESOURCE, USER EQUIPMENT, NETWORK DEVICE AND COMPUTER STORAGE MEDIUM

(71) Applicant: Guangdong OPPO Mobile Telecommunications Corp., Ltd., Guangdong (CN)

(72) Inventors: Jia Shen, Guangdong (CN); Zhi Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/499,076

(22) PCT Filed: Apr. 3, 2018

(86) PCT No.: PCT/CN2018/081775
§ 371 (c)(1),
(2) Date: Sep. 27, 2019

(87) PCT Pub. No.: WO2018/184534
PCT Pub. Date: Oct. 11, 2018

(65) Prior Publication Data
US 2021/0091913 A1    Mar. 25, 2021

Related U.S. Application Data

(60) Provisional application No. 62/482,766, filed on Apr. 7, 2017.

(51) Int. Cl.
*H04L 5/00*     (2006.01)
*H04W 72/04*    (2009.01)
*H04W 76/27*    (2018.01)

(52) U.S. Cl.
CPC ............ *H04L 5/0098* (2013.01); *H04L 5/003* (2013.01); *H04W 72/042* (2013.01);
(Continued)

(58) Field of Classification Search
CPC ..... H04L 5/0098; H04L 5/003; H04L 5/0005; H04W 72/042; H04W 72/0453; H04W 76/27
See application file for complete search history.

(56) References Cited

U.S. PATENT DOCUMENTS

2011/0275396 A1    11/2011  Nishio et al.
2013/0114473 A1    5/2013   Awoniyi et al.
(Continued)

FOREIGN PATENT DOCUMENTS

CN    102301628 A    12/2011
CN    104054385 A    9/2014
(Continued)

OTHER PUBLICATIONS

Huawei, HiSilicon, Resource allocation and indication for data channel, 3GPP TSG RAN WG1 Meeting #88bis, Spokane, USA, Apr. 3-7, 2017, R1-1705069. (Year: 2017).*
(Continued)

*Primary Examiner* — Shailendra Kumar
(74) *Attorney, Agent, or Firm* — Young Basile Hanlon & MacFarlane, P.C.

(57) ABSTRACT

There is provided a method for configuring resource, a user equipment (UE), a network device and a computer storage medium. The method for configuring resource includes receiving first information from a network-side, wherein the first information indicates to the UE configurations of at least one bandwidth part, and activating at least portion of at least
(Continued)

---

101
Receiving first information from a network-side, wherein the first information indicates to the UE configurations of at least one bandwidth part 102
Activating at least portion of at least one configured bandwidth part, or activating at least portion of the at least one configured bandwidth part through the network-side least one configured bandwidth part, or activating at least portion of the at least one configured bandwidth part through the network-side.

19 Claims, 5 Drawing Sheets

(52) U.S. Cl.
CPC ....... *H04W 72/0453* (2013.01); *H04W 76/27* (2018.02); *H04L 5/0005* (2013.01)

(56) References Cited

U.S. PATENT DOCUMENTS

| | | | | |
|---|---|---|---|---|
| 2017/0332396 | A1* | 11/2017 | Liao | H04W 72/0446 |
| 2018/0098361 | A1* | 4/2018 | Ji | H04L 5/0007 |
| 2019/0037551 | A1* | 1/2019 | Cheng | H04W 72/044 |
| 2020/0021420 | A1* | 1/2020 | Li | H04L 5/0007 |

FOREIGN PATENT DOCUMENTS

| | | |
|---|---|---|
| CN | 106255215 A | 12/2016 |
| RU | 2534752 C2 | 12/2014 |
| WO | 2013070731 A1 | 5/2013 |

OTHER PUBLICATIONS

Samsung, Resource Allocation Aspects, 3GPP TSG RAN WG1 Meeting #88bis, Spokane, USA, Apr. 3-7, 2017, R1-1705399 (Year: 2017).*
B. NTT Docomo, Inc., Resource allocation for DL/UL data, 3GPP TSG RAN WG1 Meeting #88bis, Spokane, USA, Apr. 3-7, 2017, R1-1705746 (Year: 2017).*
3GPP TSG RAN WG1 Meeting #88bis; R1-1704172; Spokane, USA, Apr. 3-7, 2017.
3GPP TSG RAN WG1 Meeting #88bis; R1-1705069 Spokane, USA, Apr. 3-7, 2017.
3GPP TSG RAN WG1 Meeting #88bis; R1-1705399 Spokane, USA, Apr. 3-7, 2017.
Extended EP Search Report for EP application 18781824.0 dated Feb. 25, 2020.
3GPP TSG RAN WG1 Meeting #88bis; R1-1705746 Spokane, USA, Apr. 1-7, 2017.
Communication pursuant to Article 94(3) EPC Examination for EP Application 18781824.0 dated Nov. 26, 2020.
Chile Office Action with English Translation for CL Application 2019-002707 dated Nov. 19, 2020.
China First Office Action with English Translation for CN Application 201911329365.8 dated Nov. 2, 2020.
India Office Action for IN Application 201917040231 dated Dec. 31, 2020.
Canadian Office Action for CA Application 3058235 dated Feb. 11, 2021. (5 pages).
European Examination Report for EP Application 18781824.0 dated Apr. 23, 2021. (7 pages).
Singapore Written Opinion for SG Application 11201909090Y dated Mar. 24, 2021. (6 pages).
Chile Second Examination Report with English Translation for CL Application 2019002707 dated Aug. 17, 2021.
European Communication pursuant to Article EPC Examination for EP Application 18781824.0 dated Oct. 7, 2021.
Tawian First Examination Report with English Translation for TW Application 11020722510 dated Jul. 30, 2021.
Russian Examination Report with English Translation for RU Application 2019135172/07(069511) dated Oct. 16, 2021.
Communication pursuant to Article 94(3) EPC for EP Application 18781824.0 dated Jan. 25, 2022. (5 pages).
Australian Examination Report for AU Application 2018247516 dated Feb. 3, 2022. (3 pages).
Canadian Examination Report for CA Application 3058235 dated Nov. 16, 2021. (4 pages).
Israel Office Action with English Translation for IL Application 269730 dated Dec. 13, 2021. (5 pages).
Chile Office Action with English Translation for CL Application 2019002707 dated Apr. 5, 2022. (4 pages).
Indonesia Office Action with English Translation for ID Application P00201909931 dated Feb. 15, 2022. (4 pages).
Japanese Office Action with English Translation for JP Application 2019553037 dated Mar. 4, 2022. (4 pages).
Korean Office Action with English Translation for KR Application 1020197028567 dated Feb. 23, 2022. (13 pages).
Singapore Invitation to Respond to Written Opinion for SG Application 11201909090Y dated Mar. 15, 2022. (6 pages).
Vivo, Discussion on NR resource allocation, 3GPP TSG RAN WG1 Meeting #88bis, R1-1704501, Apr. 3-7, 2017. (3 pages).
Australian Examination Report for AU Application 2018247516 dated Jun. 30, 2022. (3 pages).
Korean Office Action with English Translation for KR Application 1020197028567 dated Aug. 4, 2022. (8 pages).
Japan Second Office Action with English Translation for JP Application 2019553037 dated Oct. 4, 2022.
Canada Third Examination Report for CA Application 3058235 dated Sep. 28, 2022.

* cited by examiner

METHOD FOR CONFIGURING RESOURCE, USER EQUIPMENT, NETWORK DEVICE AND COMPUTER STORAGE MEDIUM

CROSS-REFERENCE TO RELATED APPLICATION(S)

This patent application is a 371 application of International Application No. PCT/CN2018/081775, filed on Apr. 3, 2018, which claims priority to U.S. Provisional Application No. 62/482,766, filed on Apr. 7, 2017, the contents of both of which are hereby incorporated by reference in their entireties.

TECHNICAL FIELD

The present disclosure relates to the technical field of information processing, and in particular, to a method for configuring resource, a user equipment (UE), a network device, and a computer storage medium.

BACKGROUND

In the $4^{th}$ Generation Long-term Evolution (4G LTE), a UE always supports system bandwidth of a carrier. Resource allocation is performed over the whole system bandwidth. In New Radio air interface in $5^{th}$ Generation New Radio (5G NR), the system bandwidth of a carrier dramatically increases which may be up to 400 MHz. A UE may only support or only need to operate in a bandwidth much smaller than the system bandwidth. And resource allocation over the whole system bandwidth introduces too large a signaling overhead. A 2-step resource assignment approach was introduced. "bandwidth part" which is smaller than the UE supporting bandwidth is indicated. Then, the detailed Physical Resource Blocks (PRBs) are indicated over the bandwidth part. And the bandwidth part is semi-statically configured by the gNodeB (gNB). A UE's bandwidth part configuration can be changed from time to time. In a slot/mini-slot (here, mini-slot can be regarded as a partial slot) containing common control signals, e.g. Synchronization Signal (SS), Physical Broadcast Channel (PBCH), System Information (SI), common-control channel, the size and location of the UE's bandwidth part must cover the bandwidth of the common control signals, so to enable the UE to read the common control signals. But in a slot/mini-slot not containing the common control signals, the size and location of the UE's bandwidth part can be re-configured to fulfill the requirements of scheduling flexibility.

In the legacy approach, a single group of bandwidth part configurations (including one or multiple configurations) is indicated by a downlink (DL) signaling (Radio Resource Control (RRC) signaling or Downlink Control Information (DCI)). This brings a deficiency that only one group of bandwidth part configurations is used for all slots/min-slots before the next available DL signaling. It means that, over all the slots/mini-slots before the next available DL signaling, the UE's bandwidth part has to always cover the bandwidth of the common control signals. This dramatically limits the flexibility of resource allocation and results in the load in-balance between different parts of the system bandwidth.

SUMMARY

In view of the above technical problem, embodiments of the present disclosure provide a method for configuring resource, a UE, a network device, and a computer storage medium.

Embodiments of the present disclosure provide a method for configuring resource carried out in a UE, including: receiving first information from a network-side, wherein the first information indicates to the UE configurations of at least one bandwidth part, and activating at least portion of at least one configured bandwidth part, or activating at least portion of the at least one configured bandwidth part through the network-side.

Embodiments of the present disclosure provide a method for configuring resource carried out in a network device, including: sending first information to a UE, wherein the first information indicates to the UE configuration of at least one bandwidth part such that the UE activates at least a portion of the at least one configured bandwidth part or such that the UE activates at least a portion of the at least one configured bandwidth part through the network device.

Embodiments of the present disclosure provide a UE, including: a first communication unit configured to receive first information from a network-side, wherein the first information indicates to the UE configurations of at least one bandwidth part, and a first processing unit configured to activate at least portion of at least one configured bandwidth part, or activate at least portion of the at least one configured bandwidth part through the network-side.

Embodiments of the present disclosure provide a network device, including: a second communication unit configured to send first information to a user equipment (UE), wherein the first information indicates to the UE configuration of at least one bandwidth part such that the UE activates at least a portion of the at least one configured bandwidth part or such that the UE activates at least a portion of the at least one configured bandwidth part through the network device.

Embodiments of the present disclosure provide a UE, including a processor and a memory having stored thereon a computer program executable on the processor, wherein the processor is configured to perform the above method when the processor executes the computer program.

Embodiments of the present disclosure provide network device comprising: a processor and a memory having stored thereon a computer program executable on the processor, wherein the processor is configured to perform the above method when the processor executes the computer program.

Embodiments of the present disclosure provide a computer storage medium having store thereon computer-executable instructions, that when being executed, perform the above method.

DETAILED DESCRIPTION

For better understanding the characteristics and technical concept of the embodiments of the present disclosure, the embodiments of the present disclosure will be described in detail with reference to the accompany drawings. The accompany drawings is provided for illustration and are not intended to limit the embodiments of the present disclosure.

First Embodiment

Figure 1:
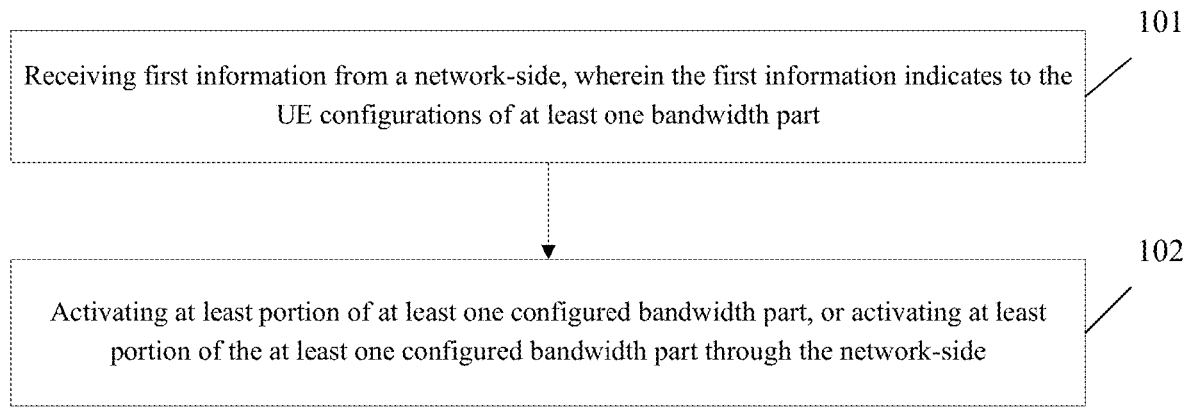
FIG. 1 is a flowchart illustrating a method for configuring resource according to an embodiment of the present disclosure.

An embodiment of the present disclosure provides a method for configuring resource. The method is carried out in a UE. As illustrated in FIG. 1 the method includes the following operations.

In block 101, a first information is received from a network side. Here, the first information is used to indicate configurations of at least one bandwidth part to the UE.

In block 102, at least portion of at least one configured bandwidth part is activated, or at least portion of the at least one configured bandwidth part is activated through the network side.

According to the above solution, the UE can receive first information, and the first information is used to indicate a set of bandwidth part configurations. The bandwidth part configuration for different slots/mini-slots may be different.

In the present embodiment, each bandwidth part configuration configures one or more bandwidths $W_{UE}$. $W_{UE} \leq W$, where W is system bandwidth. The resource for the UE's transmission and/or reception is allocated within the $W_{UE}$.

The configuration of the at least one bandwidth part may include at least one of subcarrier spacing, bandwidth part size, position of bandwidth part in frequency-domain, time-domain duration, and information on configuration of at least one signal.

The configuration may contain time-domain structure, for example, position and/or duration of DL and/or UL parts in a slot.

The information on configuration of at least one signal may be at least one of configurations of synchronization signal, broadcast channel, system information, reference signal, etc.

It is also to be noted that the above configuration information can be different between the bandwidth part configurations for different slots/mini-slots.

Description will be made below about how to activate at least portion of a bandwidth part.

In an embodiment, $W_{UE}$ is directly indicated by the first information.

In the embodiment, the receiving a first information from the network-side may include receiving the first information from the network-side via RRC signaling.

Figure 2:
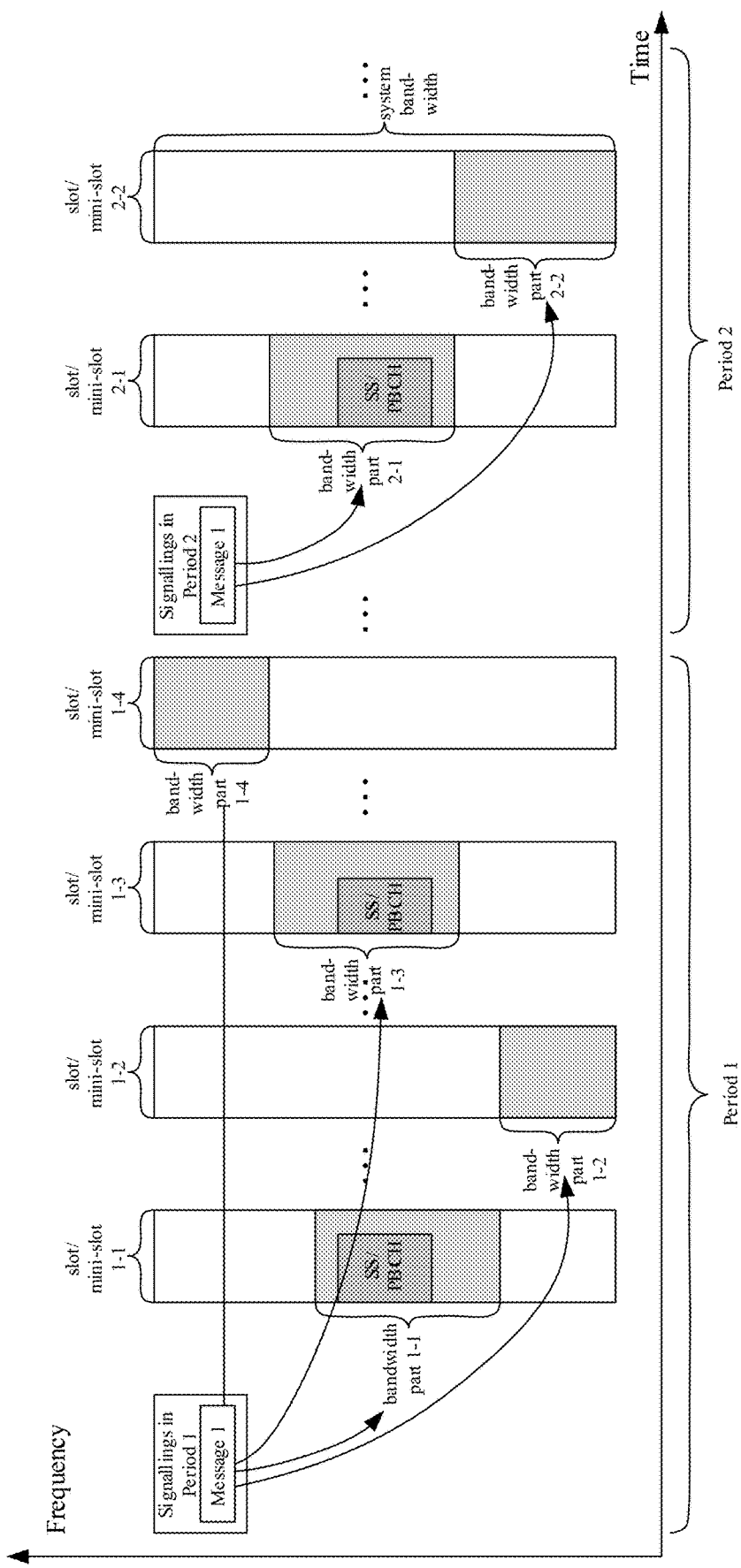
FIG. 2 is a schematic view illustrating a first scenario.

For example, as illustrated in FIG. 2, in the period 1, the UE receives a first information (e.g. in a RRC signaling) including a set of bandwidth part configurations (taking 4 configurations for example in FIG. 2), each containing configurations for at least one WUE (taking one WUE for example in FIG. 2) for one or multiple slots/mini-slots. For example, in FIG. 2, bandwidth part 1-1 is configured for slot/mini-slot 1-1, Bandwidth part 1-2 is configured for slot/mini-slot 1-2, bandwidth part 1-3 is configured for slot/mini-slot 1-3, and bandwidth part 1-4 is configured for slot/mini-slot 1-4.

The bandwidth part configurations for different slots/mini-slots are different. For example, in FIG. 2, the sizes and locations of above 4 bandwidth parts are different.

In the period 2, the UE can receive an updated first message including another set of bandwidth part configurations for the subsequent slots/mini-slots.

The above processing may be adopted such that UE can use the first information to perform configuration.

On basis of the above solution, the UE per se may activate at least portion of the at least one configured bandwidth part.

Specifically, at a time, at least portion of at least one configured bandwidth part is activated following a time-domain structure.

The method further includes receiving a fourth information from the network side. Here, the fourth information indicates the time-domain structure to the UE.

The time domain structure is used to control whether or not to activate a portion of the bandwidth part for the UE. For example, when a predetermined time is counted by a timer, control may be performed to activate the indicated part at a time.

Furthermore, the activating at least portion of at least one configured bandwidth part following a time-domain structure may include: determining a first bandwidth part of the at least one configured bandwidth part as the bandwidth part to be active and time duration corresponding to the bandwidth part to be active; when the time duration has elapsed, turning the active bandwidth part to a second bandwidth part of the at least one configured bandwidth part.

Here, the duration may be determined by using a timer. For example, when determining the first bandwidth part as an active bandwidth part, a timer may start to count time, and when the timer counts a preconfigured time period, it is determined that the time duration has elapsed.

Of course, in an embodiment, the time duration for the bandwidth part to be active may be configured in unit of slot or mini-slot or symbol or ms. In other words, for example, when the time duration has reached N mini-slots or N symbols or N ms, it is determined that the time duration has elapsed. Here, N is an integer.

The first bandwidth part may refer to all or some of the at least one bandwidth part. In other words, there may be one or more first bandwidth parts.

In the embodiment, the method may further include receiving third information from the network-side. Here, the third information indicates resource allocation within the bandwidth part.

Here, the receiving third information from the network-side may include receiving third information from the network-side via DCI.

Here, in another embodiment, a set of candidates may be indicated by first information, and $W_{UE}$ may be indicated by second information.

Firstly, first information is received from the network side.

Then, second information is received from the network side. Here, the second information indicates to the UE that at least one bandwidth part to be used is selected from the at least one bandwidth part sent via the first information. Determination is made on the bandwidth part to be used, which is selected from the candidate bandwidth part by the network-side, according to the second information.

In the present embodiment, the second information may be transmitted by using a Downlink control information (DCI) and the first information may be transmitted by using Radio Resource Control (RRC) signaling.

Figure 3:
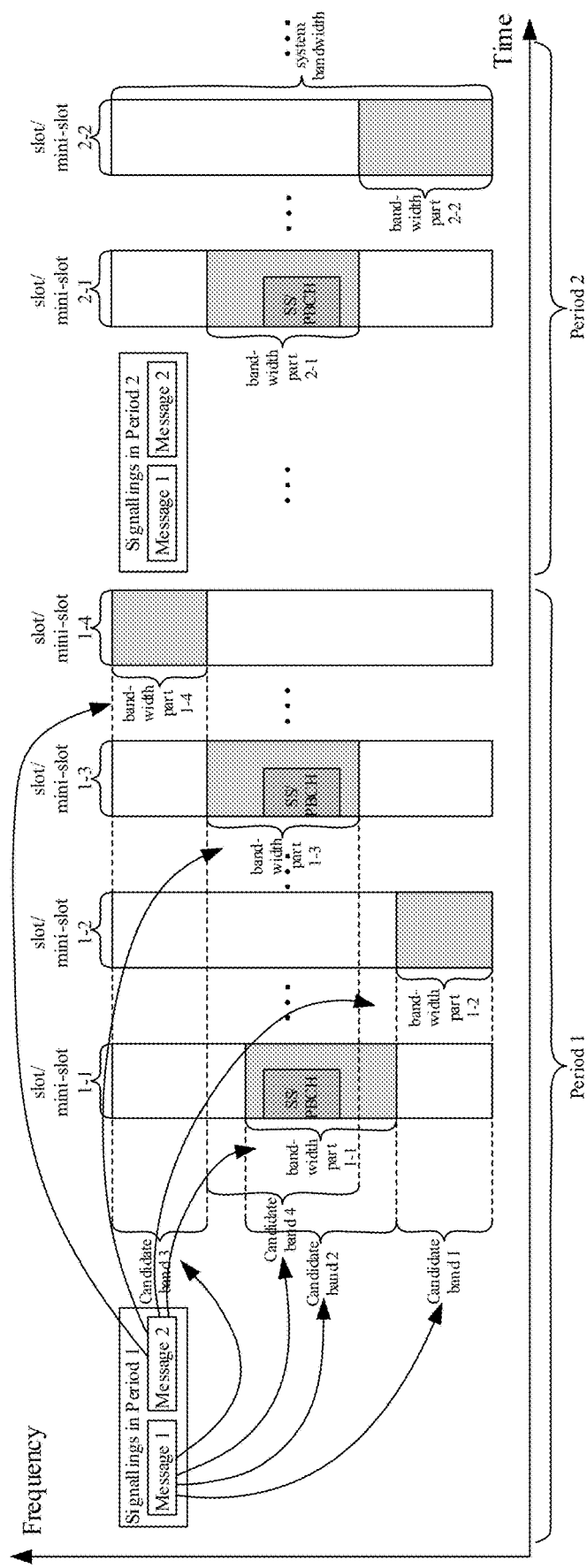
FIG. 3 is a schematic view illustrating a second scenario.

In the period 1, the UE receives first information (e.g. in a RRC signaling) including bandwidth part configurations, the bandwidth part configuration includes a plurality of configurations of $W_{UE}$ candidates (taking 4 $W_{UE}$ candidates for example in FIG. 3). The plurality of configurations of $W_{UE}$ candidates may be different. For example, in FIG. 3, sizes and positions of the 4 bandwidth parts are different.

Then, the UE receives second information (e.g. via a DCI) including a set of indications (taking 4 indications for example in FIG. 3), each indicating one or more $W_{UE}$ among the 4 candidates for one or multiple slots/mini-slots.

The set of indications contained in the second information may include identifiers of the time slots, and serial numbers of the bandwidth parts corresponding to the time slots/mini-slots, such that the selected bandwidth part in the slots/mini-slots may be obtained correspondingly.

In example in FIG. 3, one $W_{UE}$ is indicated for each slot/mini-slot. Bandwidth part 1-1 is indicated for slot/mini-slot 1-1, bandwidth part 1-2 is indicated for slot/mini-slot 1-2, bandwidth part 1-3 is indicated for slot/mini-slot 1-3, and bandwidth part 1-4 is indicated for slot/mini-slot 1-4.

The bandwidth parts indicated for different slots/mini-slots are different.

In the period 2, the UE may receive an updated first information. The first information may include another set of bandwidth part candidates. In addition or alternatively, the UE may receive an updated second message. The second information may include another set of indications for the subsequent slots/mini-slots.

In such a case, the method may further include receiving third information from the network-side. Here, the third information indicates resource allocation within the bandwidth part.

Here, the receiving third information from the network-side may include receiving the third information from the network-side via DCI.

Figure 4:
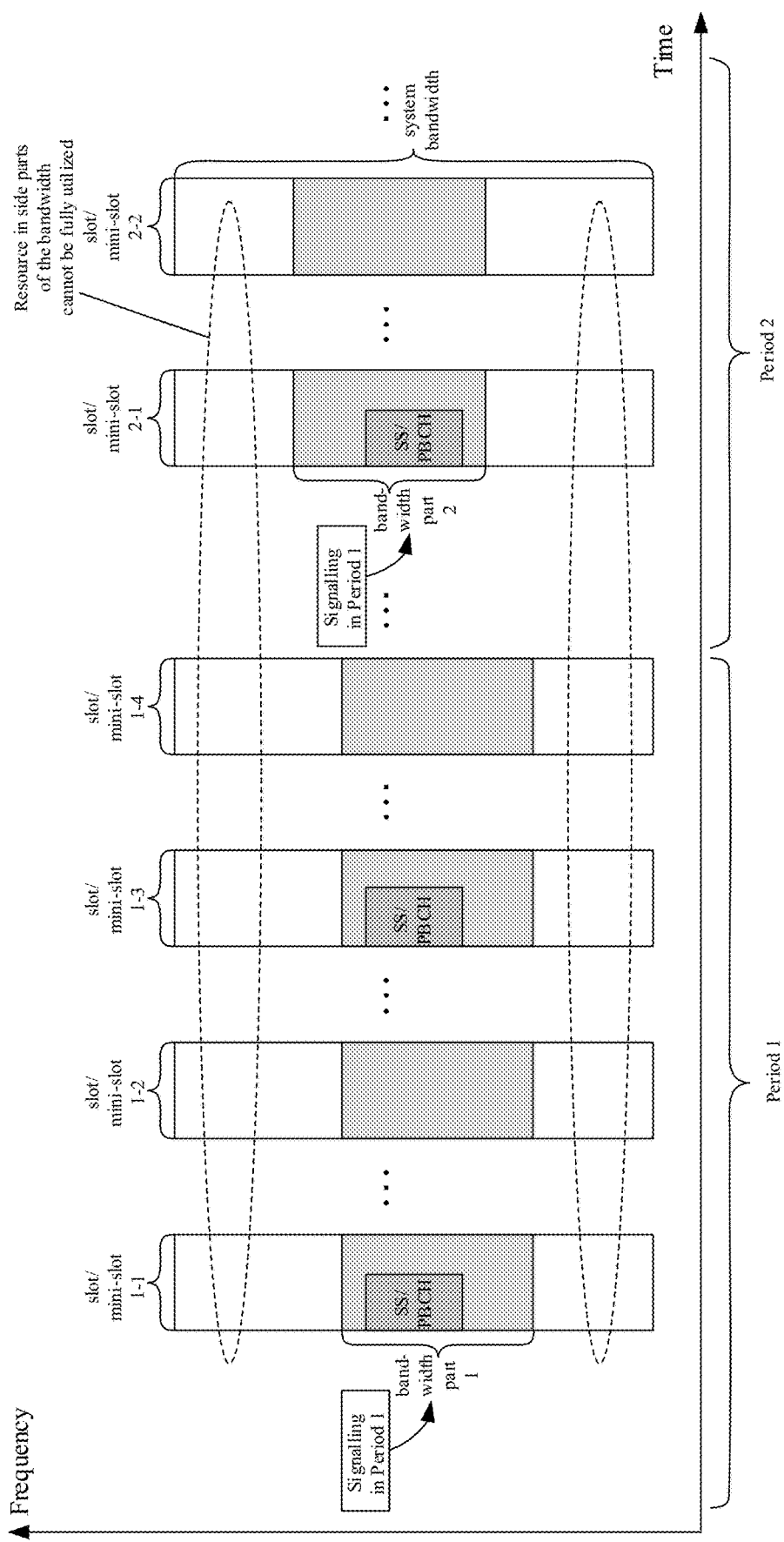
FIG. 4 is a schematic view illustrating a third scenario.

In a conventional solution, as illustrated in FIG. 4, it is assumed that there are 4 slots/mini-slots between signaling in the period 1 and signaling in the period 2. If only one group of bandwidth parts (only one bandwidth part in the group for example for simplicity in FIG. 1) is configured by the signaling in period 1, the group bandwidth parts cannot be changed slot/mini-slot by slot/mini-slot. Hence the frequency resource allocated to the UE can only contain neighboring resource of the SS and PBCH. This substantially limits the flexibility of resource allocation. And the frequency resource far from SS and Physical broadcast channel (PBCH) cannot be effectively utilized (such as the resource in the side parts of the system bandwidth in FIG. 4).

According to the solutions provided in the embodiments of the present disclosure, a UE's bandwidth parts can be changed in size and location slot/mini-slot by slot/mini-slot. In a slot/mini-slot containing SS and/or PBCH, its bandwidth part can be configured to cover the SS and/or PBCH. In a slot/mini-slot not containing SS and/or PBCH, its bandwidth part can be flexibly configured to any suitable size and location.

As can be seen, according to the technical solution of the embodiments of the present disclosure, one-short configured bandwidth part is activated for a plurality of slots/mini-slots, such that flexibility of resource allocation for a UE is sufficiently improved. In addition, since all UEs' bandwidth parts can be flexibly configured throughout the bandwidth, a much better load balancing between different parts of the system bandwidth can be achieved. The frequency resource over the whole system bandwidth can be more efficiently utilized.

Second Embodiment

Embodiments of the present disclosure provide a method for configuring resource. The method is carried out in a network device. The method include sending first information to a UE, wherein the first information indicates to the UE configuration of at least one bandwidth part such that the UE activates at least a portion of the at least one configured bandwidth part or such that the UE activates at least a portion of the at least one configured bandwidth part through the network device.

According to the above solution, the UE can receive first information, and the first information is used to indicate a set of bandwidth part configurations. The bandwidth part configuration for different slots/mini-slots may be different.

In the present embodiment, each bandwidth part configuration configures one or more bandwidths $W_{UE}$. $W_{UE} \leq W$, where W is system bandwidth. The resource for the UE's transmission and/or reception is allocated within the $W_{UE}$.

The configuration of the at least one bandwidth part may include at least one of subcarrier spacing, bandwidth part size, position of bandwidth part in frequency-domain, time-domain duration, and information on configuration of at least one signal.

The configuration may contain time-domain structure, for example, position and/or duration of DL and/or UL parts in a slot.

The information on configuration of at least one signal may be at least one of configurations of synchronization signal, broadcast channel, system information, reference signal, etc.

It is also to be noted that the above configuration information can be different between the bandwidth part configurations for different slots/mini-slots.

Description will be made below about how to activate at least portion of a bandwidth part.

In an embodiment, $W_{UE}$ is directly indicated by the first information.

In the embodiment, the sending a first information to the UE may include sending the first information to the UE during at least part of at least one time period.

For example, as illustrated in FIG. 2, In the period 1, the UE receives a first information (e.g. in a RRC signaling) including a set of bandwidth part configurations (taking 4 configurations for example in FIG. 2), each containing configurations for at least one $W_{UE}$ (taking one $W_{UE}$ for example in FIG. 2) for one or multiple slots/mini-slots. In example in FIG. 2, bandwidth part 1-1 is configured for slot/mini-slot 1-1, Bandwidth part 1-2 is configured for slot/mini-slot 1-2, bandwidth part 1-3 is configured for slot/mini-slot 1-3, and bandwidth part 1-4 is configured for slot/mini-slot 1-4.

The bandwidth part configurations for different slots/mini-slots are different. For example, in FIG. 2, the sizes and locations of above 4 bandwidth parts are different.

In the period 2, the UE can receive an updated first message including another set of bandwidth part configurations for the subsequent slots/mini-slots.

The above processing may be adopted such that UE can use the first information to perform configuration.

On basis of the above solution, the UE per se may activate at least portion of the at least one configured bandwidth part. Specifically, the activating at least portion of the at least one configured bandwidth part may include activating, at a time at least portion of at least one configured bandwidth part following a time-domain structure.

The method further includes sending a fourth information to the UE. Here, the fourth information indicates the time-domain structure to the UE.

The time domain structure is used to control whether or not to activate a portion of the bandwidth part for the UE. For example, when a predetermined time is counted by a timer, control may be performed to activate the indicated part at a time.

Furthermore, the activating at least portion of at least one configured bandwidth part following a time-domain structure may include: determining a first bandwidth part of the at least one configured bandwidth part as the bandwidth part to be active and time duration corresponding to the bandwidth part to be active; when the time duration has elapsed, turning the active bandwidth part to a second bandwidth part of the at least one configured bandwidth part.

Here, the duration may be determined by using a timer. For example, when determining the first bandwidth part as an active bandwidth part, a timer may start to count time, and when the timer counts a preconfigured time period, it is determined that the time duration has elapsed.

Of course, in an embodiment, the time duration for the bandwidth part to be active is configured in unit of slot or mini-slot or symbol or ms. In other words, for example, when the time duration has reached N mini-slots or N symbols or N ms, it is determined that the time duration has elapsed. Here, N is an integer.

The first bandwidth part may refer to all or some of the at least one bandwidth part. In other words, there may be one or more first bandwidth parts.

In the embodiment, the method may include receiving third information from the network-side. Here, the third information indicates resource allocation within the bandwidth part.

Here, the network side may send third information by sending the third information via DCI.

In another embodiment, a set of candidates may be indicated by first information, and $W_{UE}$ may be indicated by second information.

Second information is sent to the UE. Here, the second information indicates to the UE that at least one bandwidth part to be used is selected from the at least one bandwidth part sent via the first information.

The second information is sent to the UE by sending the second information to the UE during at least part of at least one time period.

In the present embodiment, the second information may be transmitted by using a DCI and the first information may be transmitted by using RRC signaling.

In the period 1, the UE receives first information (e.g. in a RRC signaling) including bandwidth part configurations, the bandwidth part configuration includes a plurality of configurations of $W_{UE}$ candidates (taking 4 $W_{UE}$ candidates for example in FIG. 3). The plurality of configurations of $W_{UE}$ candidates may be different. For example, in FIG. 3, sizes and positions of the 4 bandwidth parts are different.

Then, second information is sent to UE (e.g. via a DCI). The second information include a set of indications (taking 4 indications for example in FIG. 3), each indicating one or more $W_{UE}$ among the 4 candidates for one or multiple slots/mini-slots.

The set of indications contained in the second information may include identifiers of the time slots, and serial numbers of the bandwidth parts corresponding to the time slots/mini-slots, such that the selected bandwidth part in the slots/mini-slots may be obtained correspondingly.

In example in FIG. 3, one $W_{UE}$ is indicated for each slot/mini-slot. Bandwidth part 1-1 is indicated for slot/mini-slot 1-1, bandwidth part 1-2 is indicated for slot/mini-slot 1-2, bandwidth part 1-3 is indicated for slot/mini-slot 1-3, and bandwidth part 1-4 is indicated for slot/mini-slot 1-4.

The bandwidth parts indicated for different slots/mini-slots are different.

In the period 2, an updated first information may be also sent to UE. The first information may include another set of bandwidth part candidates. In addition or alternatively, an updated second message may be sent to the UE. The second information may include another set of indications for the subsequent slots/mini-slots.

In such a case, the method may further include sending third information to the UE. Here, the third information indicates resource allocation within the bandwidth part.

Here, the network device may send the third information via DCI.

As can be seen, according to the technical solution of the embodiments of the present disclosure, one-short configured bandwidth part is activated for a plurality of slots/mini-slots, such that flexibility of resource allocation for a UE is sufficiently improved. In addition, since all UEs' bandwidth parts can be flexibly configured throughout the bandwidth, a much better load balancing between different parts of the system bandwidth can be achieved. The frequency resource over the whole system bandwidth can be more efficiently utilized.

Third Embodiment

Figure 5:
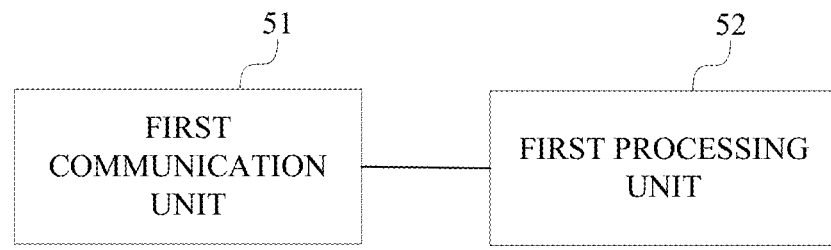
FIG. 5 is a schematic view illustrating configuration of a UE.

Embodiments of the present disclosure provide a UE. As illustrated in FIG. 5, the UE include a first communication unit 51 and a first processing unit 52.

The first communication unit 51 is configured to receive first information from a network-side, wherein the first information indicates to the UE configurations of at least one bandwidth part.

The first processing unit 52 is configured to activate at least portion of at least one configured bandwidth part, or activate at least portion of the at least one configured bandwidth part through the network-side.

According to the above solution, the UE can receive first information, and the first information is used to indicate a set of bandwidth part configurations. The bandwidth part configuration for different slots/mini-slots may be different.

In the present embodiment, each bandwidth part configuration configures one or more bandwidths $W_{UE}$. $W_{UE} \leq W$, where W is system bandwidth. The resource for the UE's transmission and/or reception is allocated within the $W_{UE}$.

The configuration of the at least one bandwidth part may include at least one of subcarrier spacing, bandwidth part size, position of bandwidth part in frequency-domain, time-domain duration, and information on configuration of at least one signal.

The configuration may contain time-domain structure, for example, position and/or duration of DL and/or UL parts in a slot.

The information on configuration of at least one signal may be at least one of configurations of synchronization signal, broadcast channel, system information, reference signal, etc.

It is also to be noted that the above configuration information can be different between the bandwidth part configurations for different slots/mini-slots.

Description will be made below about how to activate at least portion of a bandwidth part.

In an embodiment, $W_{UE}$ is directly indicated by the first information.

In the embodiment, the first communication unit 51 may receive the first information from the network-side via RRC signaling.

For example, as illustrated in FIG. 2, in the period 1, the UE receives a first information (e.g. in a RRC signaling) including a set of bandwidth part configurations (taking 4 configurations for example in FIG. 2), each containing configurations for at least one WUE (taking one WUE for example in FIG. 2) for one or multiple slots/mini-slots.

For example, in FIG. 2, bandwidth part 1-1 is configured for slot/mini-slot 1-1, Bandwidth part 1-2 is configured for slot/mini-slot 1-2, bandwidth part 1-3 is configured for slot/mini-slot 1-3, and bandwidth part 1-4 is configured for slot/mini-slot 1-4.

The bandwidth part configurations for different slots/mini-slots are different. For example, in FIG. 2, the sizes and locations of above 4 bandwidth parts are different.

In the period 2, the UE can receive an updated first message including another set of bandwidth part configurations for the subsequent slots/mini-slots.

The above processing may be adopted such that UE can use the first information directly to perform configuration.

On basis of the above solution, the UE per se may activate at least portion of the at least one configured bandwidth part. Specifically, at a time, at least portion of at least one configured bandwidth part is activated by the first processing unit 52 following a time-domain structure.

The first communication unit 51 receives a fourth information from the network side. Here, the fourth information indicates the time-domain structure to the UE.

The time domain structure is used to control whether or not to activate a portion of the bandwidth part for the UE. For example, when a predetermined time is counted by a timer, control may be performed to activate the indicated part at a time.

Furthermore, the first processing unit 52 is configured to determine a first bandwidth part of the at least one configured bandwidth part as the bandwidth part to be active and time duration corresponding to the bandwidth part to be active; when the time duration has elapsed, to turn the active bandwidth part to a second bandwidth part of the at least one configured bandwidth part.

Here, the time duration may be determined by using a timer. For example, when determining the first bandwidth part as an active bandwidth part, a timer may start to count time, and when the timer counts a preconfigured time period, it is determined that the time duration has elapsed.

Of course, in an embodiment, the time duration for the bandwidth part to be active is configured in unit of slot or mini-slot or symbol or ms. In other words, for example, when the time duration has reached N mini-slots or N symbols or N ms, it is determined that the time duration has elapsed. Here, N is an integer.

The first bandwidth part may refer to all or some of the at least one bandwidth part. In other words, there may be one or more first bandwidth parts.

The first communication unit 51 may receive third information from the network-side. Here, the third information indicates resource allocation within the bandwidth part.

Here, the third information may be received from the network side via DCI.

Here, in another embodiment, a set of candidates may be indicated by first information, and $W_{UE}$ may be indicated by second information.

Then, second information is received by the first communication unit 51 from the network side. Here, the second information indicates to the UE that at least one bandwidth part to be used is selected from the at least one bandwidth part sent via the first information.

The first processing unit 52 determines the bandwidth part to be used, which is selected from the candidate bandwidth part by the network-side, according to the second information.

In the present embodiment, the second information may be transmitted by using a DCI and the first information may be transmitted by using RRC signaling.

In the period 1, the UE receives first information (e.g. in a RRC signaling) including bandwidth part configurations, the bandwidth part configuration includes a plurality of configurations of $W_{UE}$ candidates (taking 4 $W_{UE}$ candidates for example in FIG. 3). The plurality of configurations of $W_{UE}$ candidates may be different. For example, in FIG. 3, sizes and positions of the 4 bandwidth parts are different.

Then, the UE receives second information (e.g. via a DCI) including a set of indications (taking 4 indications for example in FIG. 3), each indicating one or more WUE among the 4 candidates for one or multiple slots/mini-slots.

The set of indications contained in the second information may include identifiers of the time slots, and serial numbers of the bandwidth parts corresponding to the time slots/mini-slots, such that the selected bandwidth part in the slots/mini-slots may be obtained correspondingly.

In example in FIG. 3, one $W_{UE}$ is indicated for each slot/mini-slot. Bandwidth part 1-1 is indicated for slot/mini-slot 1-1, bandwidth part 1-2 is indicated for slot/mini-slot 1-2, bandwidth part 1-3 is indicated for slot/mini-slot 1-3, and bandwidth part 1-4 is indicated for slot/mini-slot 1-4.

The bandwidth parts indicated for different slots/mini-slots are different.

In the period 2, an updated first information may be also sent to UE. The first information may include another set of bandwidth part candidates. In addition or alternatively, an updated second message may be sent to the UE. The second information may include another set of indications for the subsequent slots/mini-slots.

In the period 2, the UE may receive an updated first information. The first information may include another set of bandwidth part candidates. In addition or alternatively, the UE may receive an updated second message. The second information may include another set of indications for the subsequent slots/mini-slots.

The first communication unit 51 may receive third information from the network-side. Here, the third information indicates resource allocation within the bandwidth part.

The first communication unit 51 may receive the third information from the network-side via DCI.

As can be seen, according to the technical solution of the embodiments of the present disclosure, one-short configured bandwidth part is activated for a plurality of slots/mini-slots, such that flexibility of resource allocation for a UE is sufficiently improved. In addition, since all UEs' bandwidth parts can be flexibly configured throughout the bandwidth, a much better load balancing between different parts of the system bandwidth can be achieved. The frequency resource over the whole system bandwidth can be more efficiently utilized.

Fourth Embodiment

Embodiments of the present disclosure provide a network device. The network device includes a second communication unit.

The second communication unit is configured to send first information to a UE, wherein the first information indicates to the UE configuration of at least one bandwidth part such that the UE activates at least a portion of the at least one configured bandwidth part or such that the UE activates at least a portion of the at least one configured bandwidth part through the network device.

According to the above solution, the UE can receive first information, and the first information is used to indicate a set of bandwidth part configurations. The bandwidth part configuration for different slots/mini-slots may be different.

In the present embodiment, each bandwidth part configuration configures one or more bandwidths $W_{UE}$. $W_{UE} \leq W$, where W is system bandwidth. The resource for the UE's transmission and/or reception is allocated within the $W_{UE}$.

The configuration of the at least one bandwidth part may include at least one of subcarrier spacing, bandwidth part size, position of bandwidth part in frequency-domain, time-domain duration, and information on configuration of at least one signal.

The configuration may contain time-domain structure, for example, position and/or duration of DL and/or UL parts in a slot.

The information on configuration of at least one signal may be at least one of configurations of synchronization signal, broadcast channel, system information, reference signal, etc.

It is also to be noted that the above configuration information can be different between the bandwidth part configurations for different slots/mini-slots.

Description will be made below about how to activate at least portion of a bandwidth part.

In an embodiment, $W_{UE}$ is directly indicated by the first information.

In the embodiment, the second communication unit may send the first information to the UE during at least part of at least a time period.

For example, as illustrated in FIG. 2, in the period 1, the UE receives a first information (e.g. in a RRC signaling) including a set of bandwidth part configurations (taking 4 configurations for example in FIG. 2), each containing configurations for at least one $W_{UE}$ (taking one $W_{UE}$ for example in FIG. 2) for one or multiple slots/mini-slots. For example, in FIG. 2, bandwidth part 1-1 is configured for slot/mini-slot 1-1, Bandwidth part 1-2 is configured for slot/mini-slot 1-2, bandwidth part 1-3 is configured for slot/mini-slot 1-3, and bandwidth part 1-4 is configured for slot/mini-slot 1-4.

The bandwidth part configurations for different slots/mini-slots are different. For example, in FIG. 2, the sizes and locations of above 4 bandwidth parts are different.

In the period 2, the UE can receive an updated first message including another set of bandwidth part configurations for the subsequent slots/mini-slots.

The above processing may be adopted such that UE can use the first information to perform configuration.

The second communication unit sends a fourth information to the UE. Here, the fourth information indicates the time-domain structure to the UE.

The time domain structure is used to control whether or not to activate a portion of the bandwidth part for the UE. For example, when a predetermined time is counted by a timer, control may be performed to activate the indicated part at a time.

Accordingly, at least portion of at least one configured bandwidth part is activated following a time-domain structure. Specifically, a first bandwidth part of the at least one configured bandwidth part is determined as the bandwidth part to be active and time duration corresponding to the bandwidth part to be active; when the time duration has elapsed, turning the active bandwidth part to a second bandwidth part of the at least one configured bandwidth part.

Here, the duration may be determined by using a timer. For example, when determining the first bandwidth part as an active bandwidth part, a timer may start to count time, and when the timer counts a preconfigured time period, it is determined that the time duration has elapsed.

Of course, in an embodiment, the time duration for the bandwidth part to be active may be configured in unit of slot or mini-slot or symbol or ms. In other words, for example, when the time duration has reached N mini-slots or N symbols or N ms, it is determined that the time duration has elapsed. Here, N is an integer.

The first bandwidth part may refer to all or some of the at least one bandwidth part. In other words, there may be one or more first bandwidth parts.

In the embodiment, the second communication unit may send third information to the UE. Here, the third information indicates resource allocation within the bandwidth part.

Here, the second communication unit may send third information to the UE via DCI.

Here, in another embodiment, a set of candidates may be indicated by first information, and $W_{UE}$ may be indicated by second information.

The second communication unit may send the second information to the UE. Here, the second information indicates to the UE that at least one bandwidth part to be used is selected from the at least one bandwidth part sent via the first information.

The second communication unit may send the second information to the UE during at least part of at least time period.

In the present embodiment, the second information may be transmitted by using a DCI and the first information may be transmitted by using RRC signaling.

In the period 1, the UE receives first information (e.g. in a RRC signaling) including bandwidth part configurations, the bandwidth part configuration includes a plurality of configurations of $W_{UE}$ candidates (taking 4 $W_{UE}$ candidates for example in FIG. 3). The plurality of configurations of $W_{UE}$ candidates may be different. For example, in FIG. 3, sizes and positions of the 4 bandwidth parts are different.

Then, second information is sent to the UE (e.g. via a DCI). The second information may include a set of indications (taking 4 indications for example in FIG. 3), each indicating one or more $W_{UE}$ among the 4 candidates for one or multiple slots/mini-slots.

The set of indications contained in the second information may include identifiers of the time slots, and serial numbers of the bandwidth parts corresponding to the time slots/mini-slots, such that the selected bandwidth part in the slots/mini-slots may be obtained correspondingly.

In example in FIG. 3, one $W_{UE}$ is indicated for each slot/mini-slot. Bandwidth part 1-1 is indicated for slot/mini-slot 1-1, bandwidth part 1-2 is indicated for slot/mini-slot 1-2, bandwidth part 1-3 is indicated for slot/mini-slot 1-3, and bandwidth part 1-4 is indicated for slot/mini-slot 1-4.

The bandwidth parts indicated for different slots/mini-slots are different.

In the period 2, an updated first information may be sent to the UE. The first information may include another set of bandwidth part candidates. In addition or alternatively, an updated second message may be sent to the UE. The second information may include another set of indications for the subsequent slots/mini-slots.

The second communication unit may send third information to the UE. Here, the third information indicates resource allocation within the bandwidth part.

Here, the network device may send the third information via DCI.

As can be seen, according to the technical solution of the embodiments of the present disclosure, one-short configured bandwidth part is activated for a plurality of slots/mini-slots, such that flexibility of resource allocation for a UE is sufficiently improved. In addition, since all UEs' bandwidth parts can be flexibly configured throughout the bandwidth, a much better load balancing between different parts of the system bandwidth can be achieved. The frequency resource over the whole system bandwidth can be more efficiently utilized.

Figure 6:
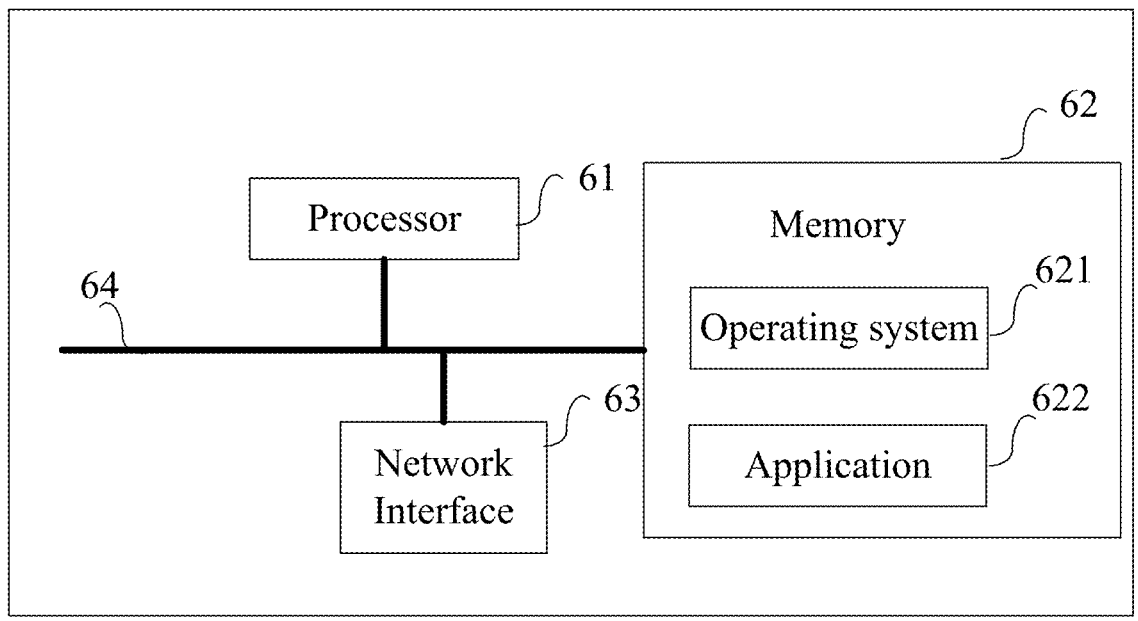
FIG. 6 is a schematic view illustrating configuration of hardware architecture.

Embodiments of the present disclosure further provide a hardware architecture of a UE or a network device. As illustrated in FIG. 6, the hardware architecture includes at least one processor 61, a memory 62, at least one network interface 63. Various components are connected with each other via a bus system 64. It can be understood that the bus system 64 is used for implementing the communications among the components. In addition to a data bus, the bus system may further include a power bus, control bus and state signal bus. However, for clarity, various buses are all represented by the bus system 64.

It can be understood that the memory 62 in the embodiments of the present disclosure may be a volatile memory or a non-volatile memory, or include both of the volatile memory and non-volatile memory.

In some embodiments, the memory 62 stores executable modules or data structures, or subset of the executable modules or data structures, or extended set of the executable modules or data structures.

The memory 62 may further include an operating system 621 and application 622.

Here, the processor 61 is configured to perform the method according to the first embodiment or the second embodiment, which is not be elaborated herein.

Embodiments of the present disclosure provide a computer storage medium having store thereon computer-executable instructions, that when being executed, perform the method according to the first embodiment or the second embodiment.

The above device according to the embodiments of the present disclosure may be also stored in a computer-readable storage medium when the device is implemented in form of software function modules and sold or used as a separate product. On basis of such understanding, the technical solutions of the embodiments of the present disclosure essentially or the parts that contribute to the prior art may be embodied in form of a software product. The computer software product is stored in a storage medium, includes multiple instructions such that a computer device (which may be a personal computer, a server, a networking device, or the like) can perform all or part of the various embodiments of the present disclosure. The storage medium includes various medium, such as a USB stick, removable hard drive, read only memory (ROM), magnetic disc or optical disk, which can store programming codes. Thus, the embodiments of the present disclosure are not limited to any specific combination of hardware and software.

Although preferred embodiments of the present disclosure are disclosed for purpose of illustration, it will be appreciated by those skilled in the art that various modifications, addition and substitutions may be possible. Thus, the scope of the present disclosure is not limited to the above embodiments.

What is claimed is:

1. A method for configuring resource carried out in a user equipment (UE), comprising:
   receiving first information from a network-side, wherein the first information indicates to the UE configurations of bandwidth parts, and wherein the bandwidth parts comprise a first bandwidth part and a second bandwidth part;
   activating the first bandwidth part of the configured bandwidth parts, wherein the first bandwidth part of the configured bandwidth parts is determined as an active bandwidth part; and
   when a time duration corresponding to the active bandwidth part has elapsed, turning the active bandwidth part to the second bandwidth part of the configured bandwidth parts,
   wherein the configurations of the bandwidth parts comprise the following of each of the bandwidth parts: a subcarrier spacing, a size, a position in frequency-domain, and information on configuration of at least one signal of each of the bandwidth parts, and wherein the configuration of the at least one signal comprises configurations of a synchronization signal, a broadcast channel, and a reference signal.

2. The method of claim 1, wherein activating the first bandwidth part of the configured bandwidth parts comprises:
   activating at a time, the first bandwidth part of the configured bandwidth parts following a time-domain structure.

3. The method of claim 2, wherein the configurations of the bandwidth parts comprise the time-domain structure.

4. The method of claim 1, wherein the configurations of the bandwidth parts further comprise a time duration.

5. The method of claim 1, wherein activating the first bandwidth part of the configured bandwidth parts through the network-side comprises:
   receiving second information from the network-side, wherein the second information indicates to the UE that at least one bandwidth part to be used is selected from the bandwidth parts sent via the first information; and
   determining the bandwidth part to be used, which is selected from candidate bandwidth part by the network-side, according to the second information.

6. The method of claim 5, wherein receiving the second information from the network-side comprises:
   receiving the second information from the network-side via Downlink control information (DCI).

7. The method of claim 1, wherein receiving the first information from the network-side comprises:
   receiving the first information from the network-side via Radio Resource Control (RRC) signaling.

8. The method of claim 1, further comprising:
   receiving third information from the network-side, wherein the third information indicates resource allocation within the bandwidth part.

9. The method of claim 8, wherein receiving the third information from the network-side comprises:
   receiving the third information from the network-side via Downlink Control Information (DCI).

10. A non-transitory computer storage medium having stored thereon computer-executable instructions that, when executed, perform the method of claim 1.

11. A user equipment (UE), comprising: a processor and a network interface, wherein
    the processor is configured to receive, through the network interface, first information from a network-side, the first information indicates to the UE configurations of bandwidth parts, and the bandwidth parts comprise a first bandwidth part and a second bandwidth part;

the processor is further configured to activate the first bandwidth part of the configured bandwidth parts, the first bandwidth part of the configured bandwidth parts is determined as an active bandwidth part, the processor is further configured to turn the active bandwidth part to the second bandwidth part of the configured bandwidth parts when a time duration corresponding to the active bandwidth part has elapsed, and the configurations of the bandwidth parts comprise the following of each of the bandwidth parts: a subcarrier spacing, a size, a position in frequency-domain, and information on configuration of at least one signal of each of the bandwidth parts, the configuration of at least one signal comprises configurations of a synchronization signal, a broadcast channel, and a reference signal.

12. The UE of claim 11, wherein the processor is configured to activate at a time, the first bandwidth part of the configured bandwidth parts following a time-domain structure.

13. The UE of claim 12, wherein the configurations of the bandwidth parts comprise the time-domain structure.

14. The UE of claim 11, wherein the configurations of the bandwidth parts further comprise time-domain duration.

15. The UE of claim 11, wherein the processor is configured to receive, through the network interface, second information from the network-side, wherein the second information indicates to the UE that at least one bandwidth part to be used is selected from the bandwidth parts sent via the first information; and the processor is configured to determine the bandwidth part to be used, which is selected from candidate bandwidth part by the network-side, according to the second information.

16. The UE of claim 15, wherein the processor is configured to receive, through the network interface, the second information from the network-side via Downlink control information (DCI).

17. The UE of claim 11, wherein the processor is configured to receive, through the network interface, the first information from the network-side via Radio Resource Control (RRC) signaling.

18. The UE of claim 11, wherein the processor is configured to receive, through the network interface, third information from the network-side, wherein the third information indicates resource allocation within the bandwidth part.

19. The UE of claim 18, wherein the processor is configured to receive, through the network interface, the third information from the network-side via Downlink Control Information (DCI).

* * * * *